United States Patent
Hu et al.

(10) Patent No.: US 10,459,112 B2
(45) Date of Patent: Oct. 29, 2019

(54) DETERMINING A CHARACTERISTIC OF A MATERIAL SURROUNDING A WELLBORE BASED ON COUNT RATES OF SCATTERED PHOTONS

(71) Applicant: Halliburton Energy Services, Inc., Houston, TX (US)

(72) Inventors: Yike Hu, Houston, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/569,009

(22) PCT Filed: Nov. 29, 2016

(86) PCT No.: PCT/US2016/063903
§ 371 (c)(1),
(2) Date: Oct. 24, 2017

(87) PCT Pub. No.: WO2018/101903
PCT Pub. Date: Jun. 7, 2018

(65) Prior Publication Data
US 2019/0056525 A1    Feb. 21, 2019

(51) Int. Cl.
*G01V 5/12* (2006.01)
*E21B 47/00* (2012.01)
*G01V 5/10* (2006.01)

(52) U.S. Cl.
CPC ............ *G01V 5/125* (2013.01); *G01V 5/12* (2013.01); *E21B 47/00* (2013.01); *G01V 5/108* (2013.01)

(58) Field of Classification Search
CPC .......... G01V 5/125; G01V 5/108; E21B 47/00
See application file for complete search history.

(56) References Cited

U.S. PATENT DOCUMENTS

| | | | |
|---|---|---|---|
| 2,944,148 A | 7/1960 | Johnson et al. | |
| 3,202,822 A | 8/1965 | Kehler | |
| 3,321,625 A | 5/1967 | Wahl | |
| 3,483,376 A * | 12/1969 | Locke | G01V 5/107 250/265 |
| 3,521,063 A | 7/1970 | Tittman | |
| 3,864,569 A | 2/1975 | Tittman | |
| 4,048,495 A | 9/1977 | Ellis | |

(Continued)

OTHER PUBLICATIONS

International Search Report and The Written Opinion of the International Search Authority, or the Declaration, Aug. 28, 2017, PCT/US2016/063903, 19 pages, ISA/KR.

*Primary Examiner* — Marcus H Taningco
(74) *Attorney, Agent, or Firm* — Haynes and Boone, LLP

(57) ABSTRACT

A system and method to determine a characteristic of a wellbore based on count rates of scattered photons. The system and method can include determining at least one characteristic of a material surrounding a wellbore by, emitting photons from a photon source at a location in the wellbore, detecting, via one or more detectors, photons scattered by the material, counting the scattered photons based on an energy level, producing count rates of the detected photons for various energy ranges, and calculating a value of the characteristic based on the count rates. The material can be at least one of mud, mud cake, and earth formation.

19 Claims, 13 Drawing Sheets

(56) References Cited

U.S. PATENT DOCUMENTS

| | | | |
|---|---|---|---|
| 4,283,624 A * | 8/1981 | Mills, Jr. | G01V 5/108 |
| | | | 250/264 |
| 4,490,609 A | 12/1984 | Chevalier | |
| 4,558,220 A * | 12/1985 | Evans | G01V 5/125 |
| | | | 250/266 |
| 4,578,580 A * | 3/1986 | Smith, Jr. | G01V 5/125 |
| | | | 250/269.3 |
| 4,628,202 A | 12/1986 | Minette | |
| 4,814,611 A | 3/1989 | Moake | |
| 4,857,729 A * | 8/1989 | Gadeken | E21B 47/1015 |
| | | | 250/260 |
| 5,282,133 A | 1/1994 | Watson | |
| 5,528,029 A | 6/1996 | Chapellat et al. | |
| 2004/0046115 A1* | 3/2004 | Berard | G01N 23/12 |
| | | | 250/256 |
| 2004/0210393 A1* | 10/2004 | Ellis | G01V 5/125 |
| | | | 702/8 |
| 2010/0252725 A1* | 10/2010 | Stewart | G01V 5/125 |
| | | | 250/269.3 |
| 2011/0198489 A1 | 8/2011 | Roberts | |
| 2013/0261974 A1 | 10/2013 | Stewart et al. | |
| 2014/0339410 A1 | 11/2014 | Zhou et al. | |
| 2018/0245451 A1* | 8/2018 | Hu | E21B 47/0005 |

\* cited by examiner

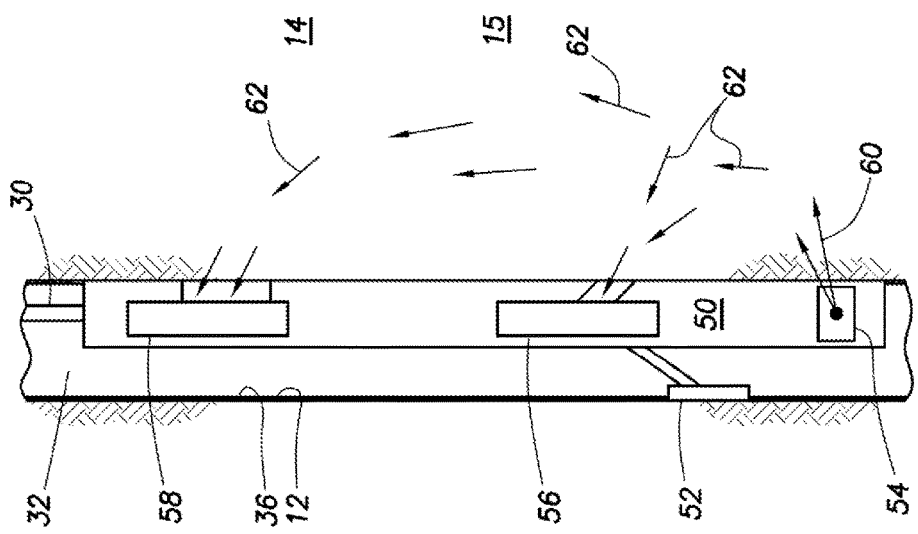
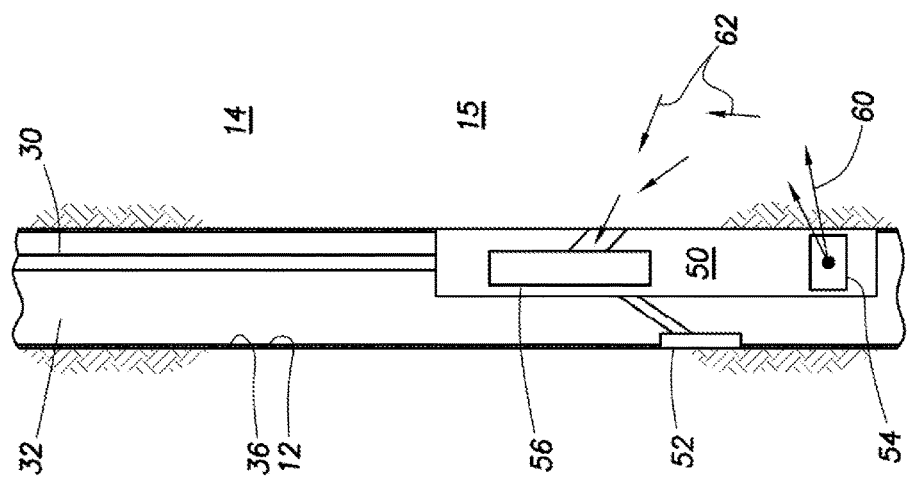

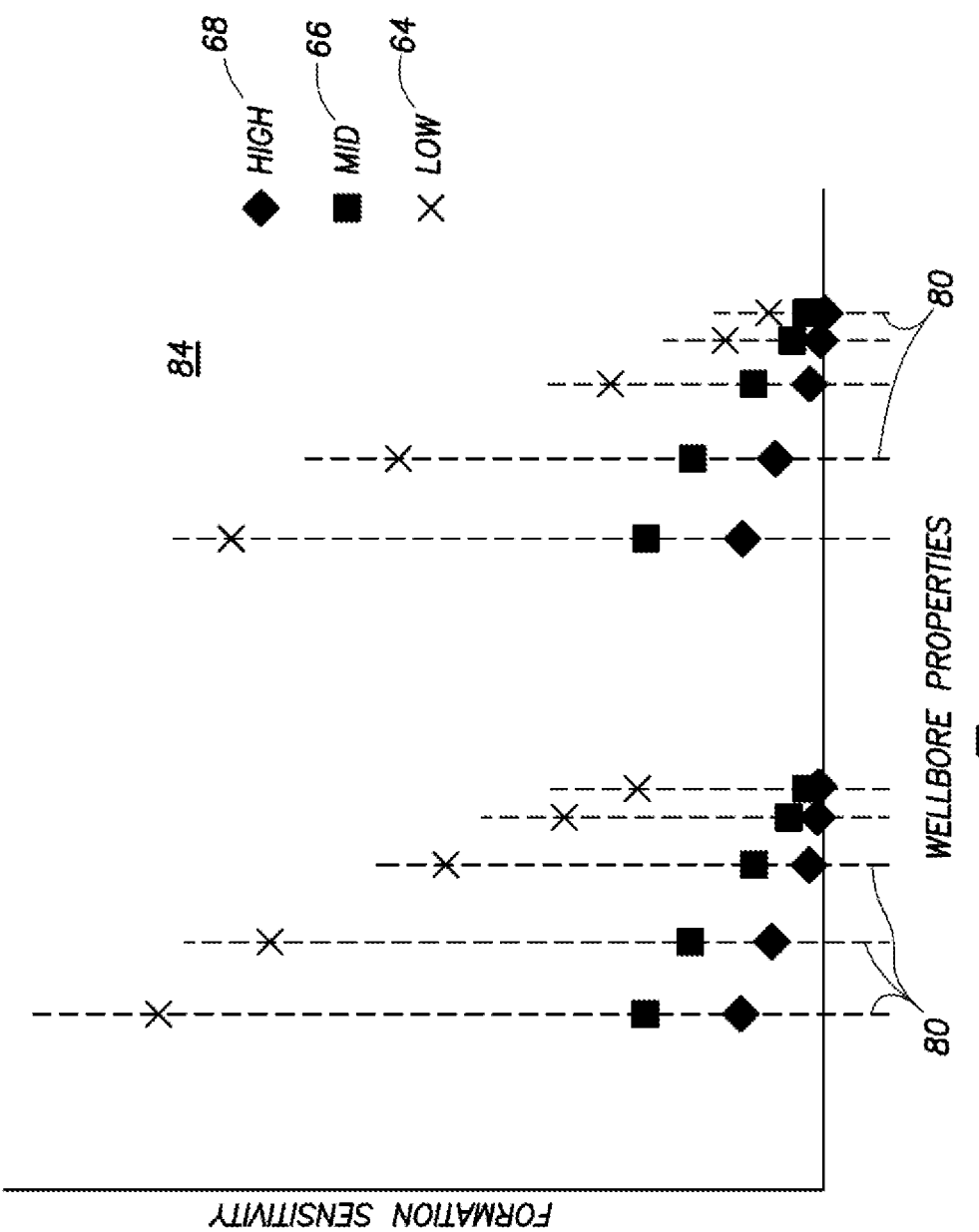

DETERMINING A CHARACTERISTIC OF A MATERIAL SURROUNDING A WELLBORE BASED ON COUNT RATES OF SCATTERED PHOTONS

CROSS-REFERENCE TO RELATED APPLICATION

The present application is a U.S. National Stage patent application of International Patent Application No. PCT/US2016/063903, filed on Nov. 29, 2016, the benefit of which is claimed and the disclosure of which is incorporated herein by reference in its entirety.

TECHNICAL FIELD

The present disclosure generally relates to oilfield equipment and, in particular, to downhole tools, drilling and related systems and techniques for determining wellbore characteristics. More particularly still, the present disclosure relates to methods and systems for determining one or more characteristics of an earth formation and/or a wellbore environment by measuring count rates of photons (or gamma rays) scattered back to the wellbore by material(s) surrounding the wellbore, and calculating the wellbore characteristics based on the counts rates and/or their ratios.

BACKGROUND

A gamma ray scintillation type detector consists of a scintillation crystal optically coupled to a photomultiplier tube. Intensity of light induced within the crystal by an impinging gamma ray is proportional to the energy of the gamma ray. The optically coupled photomultiplier tube generates an electrical pulse which is proportional to the intensity of the light generated within the scintillation crystal. It follows, therefore, that the electrical pulse generated by the photomultiplier tube is proportional to the energy of the gamma ray impinging upon the scintillation crystal. These electrical pulses can be counted based on their energy level, which follows that such counts can be seen as a count rate of gamma rays at a particular energy level that have been detected by the scintillation crystal (or any other suitable gamma ray or photon detector). These counts can be grouped together to represent one or more count rates for particular energy ranges (or energy windows) of the collected gamma rays (or photons).

These count rates can be used to determine characteristics of material(s) surrounding the wellbore during logging operations. Logging wellbore characteristics during or after a wellbore has been formed provides valuable information about material(s) surrounding the wellbore, such as mud cake thickness and density, earth formation density, photoelectric factor of the material(s), etc. Logging can be done in various measurement while drilling MWD and/or logging while drilling LWD operations, as well as logging operations (e.g. wireline logging, coiled tubing logging, slickline logging, etc.) which can be independent of drilling operations. Current methods for determining wellbore characteristics can be seen as characterizing a measurement of a wellbore characteristic by correlating each energy-window count rate from multiple detectors to parameters of interest. More often than not, the mathematical representations of these correlations can be both complex and subject to undesirable statistical perturbations.

Therefore, it will be readily appreciated that improvements in the arts of using gamma ray count rates to determine wellbore characteristics are continually needed.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. Embodiments are described in detail hereinafter with reference to the accompanying figures, in which:

FIG. 3 is another representative partial cross-sectional view of a portion of a wellbore with a one detector logging tool that utilizes principles of the current disclosure;

FIG. 4 is another representative partial cross-sectional view of a portion of a wellbore with a two detector logging tool that utilizes principles of the current disclosure;

FIG. 7 is a representative plot of formation sensitivity of scattered photons detected by the logging tool vs. wellbore properties or conditions;

DETAILED DESCRIPTION OF THE DISCLOSURE

Figure 1A:
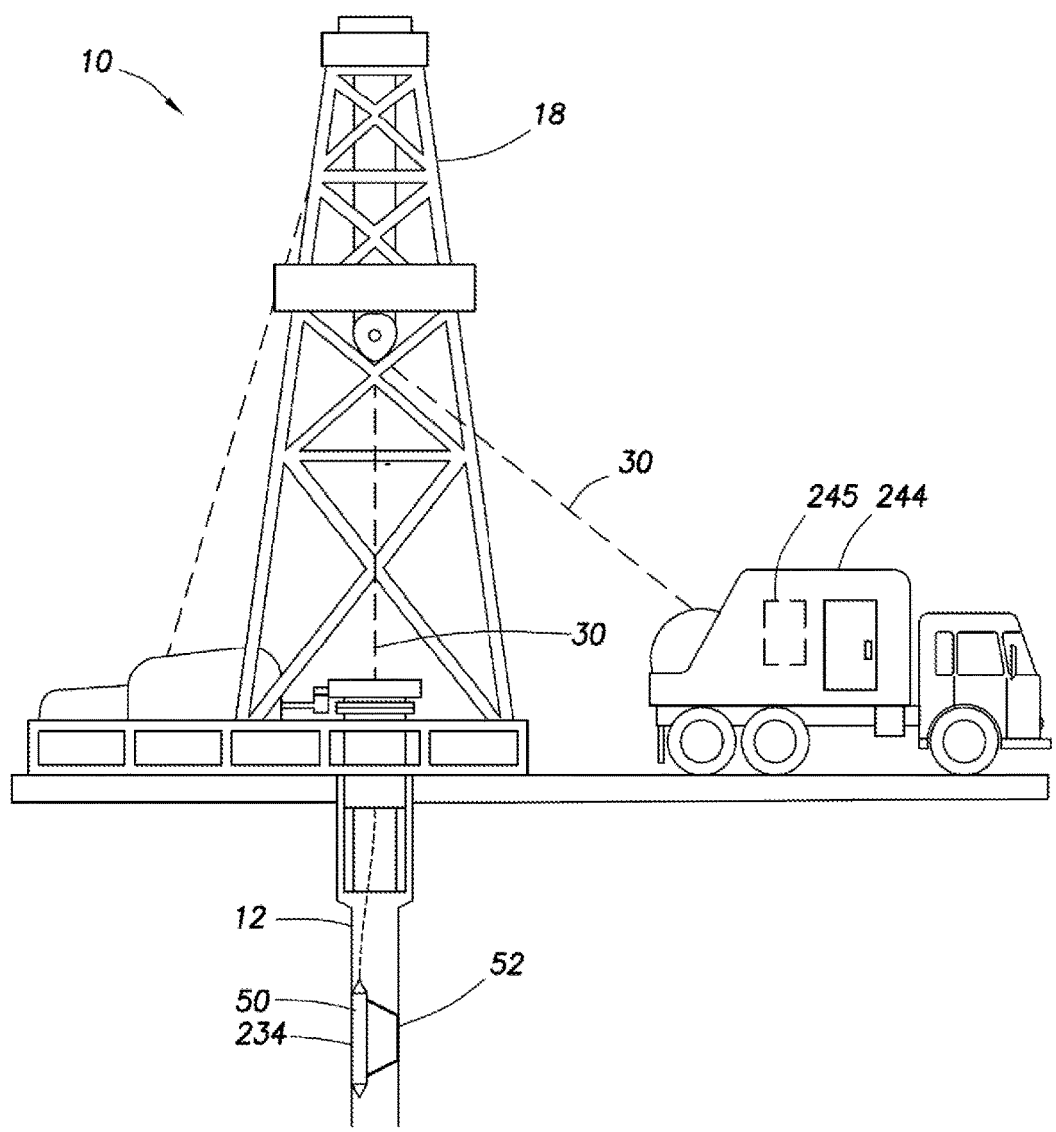
FIG. 1A is a representative partial cross-sectional view of a system for capturing subsurface measurement data in a logging while drilling (LWD) operation, according to one or more example embodiments.

The disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover even though a Figure may depict a horizontal wellbore or a vertical wellbore, unless indicated otherwise, it should be understood by those skilled in the art that the apparatus according to the present disclosure is equally well suited for use in wellbores having other orientations including vertical wellbores, slanted wellbores, multilateral wellbores or the like. Likewise, unless otherwise noted, even though a Figure may depict an offshore operation, it should be understood by those skilled in the art that the method and/or system according to the present disclosure is equally well suited for use in onshore operations and vice-versa. Further, unless otherwise noted, even though a Figure may depict a cased hole, it should be understood by those skilled in the art that the method and/or system according to the present disclosure is equally well suited for use in open hole operations.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. It should also be understood that, as used herein, "first," "second," and "third," are assigned arbitrarily and are merely intended to differentiate between two or more objects, etc., as the case may be, and does not indicate any sequence. Furthermore, it is to be understood that the mere use of the word "first" does not require that there be any "second," and the mere use of the word "second" does not require that there be any "first" or "third," etc.

The terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

Generally, this disclosure provides a method and system to evaluate characteristics of material(s) surrounding a wellbore by measuring gamma rays scattered back from outside of a tool, where the gamma rays were emitted from a gamma source into an environment surrounding the wellbore with a portion of the gamma rays (or photons) scattered back to the tool. A representative tool can consist of a gamma source, one or more photon (or gamma ray) detectors, and a housing suitable for downhole conditions. This method and system can exploit the different depths of radial penetration from the tool into the surrounding environment for photons within different energy ranges and can combine count rates of the different energy ranges from one or more detectors to determine the characteristics of the materials surrounding the wellbore (e.g. a formation density, a formation photoelectric factor, a mud density, a mud photoelectric factor, and a mud cake density and thickness). The mathematical combination of count rates for different energy ranges can enhance measurement sensitivity to these material characteristics, which can provide a method and system to better evaluate these material characteristics.

FIG. 1A shows an elevation view in partial cross-section of a wellbore system 10 which can be utilized to drill a wellbore 12 for production of hydrocarbons and/or other fluids. Wellbore 12 can extend through various earth strata in an oil and gas formation 14 located below the earth's surface 16. Wellbore system 10 can include a rig (or derrick) 18 and a wellhead 40. The rig 18 can include a hoisting apparatus 20, a travel block 22, and a swivel 24 for raising and lowering casing, or other types of conveyance vehicles 30 such as drill pipe, coiled tubing, production tubing, and other types of pipe or tubing strings, such as wireline, slickline, and the like. In FIG. 1A, the conveyance vehicle 30 is a substantially tubular, axially extending drill string, formed of a plurality of pipe joints coupled together end-to-end supporting a bottom hole assembly (BHA) 26 and a drill bit 28. However, it should be understood that the conveyance vehicle 30 can be any of the other suitable conveyance vehicles, such as those mentioned above. The rig 18 can also include a kelly 44, a rotary table 48, and other equipment (not shown) associated with rotation and/or translation of the conveyance vehicle 30 within the wellbore 12.

The wellbore system 10 in FIG. 1A is shown as an onshore system, but the system 10 can also be an offshore system. Such a system 10 can have a rig 18 mounted on an oil or gas platform, and/or semi-submersibles, drill ships, and the like (not shown). One or more subsea conduits or risers can extend from the platform to a subsea wellhead 40. The tubing string 30 can extend down from rig 18, through subsea conduits, through the wellhead 40, and into wellbore 12. However, if the wellbore system 10 is an onshore system, as in FIG. 1A, then subsea conduits may not be necessary. Wellbore 12 may be formed of single or multiple bores, extending into the formation 14, and disposed in any orientation (e.g. vertical, inclined, horizontal, combinations of these, etc.). The wellbore system 10 can also include multiple wellbores 12 with each wellbore 12 having single or multiple bores. The rig 18 may be proximate the wellhead 40, as shown in FIG. 1A, or spaced apart from a wellhead 40, as in an onshore arrangement. One or more pressure control devices 42, blowout preventers (BOPs), and other equipment associated with drilling or producing a wellbore 12 can also be provided in the system 10.

The wellbore system 10 can also include a logging tool 50 used to evaluate material surrounding the wellbore 12. The logging tool 50 is shown in FIG. 1A as being part of the BHA 26, but it can also be interconnected in the drill string 30 closer or farther away from the drill bit 28. The logging tool 50 can also be extended into the wellbore on a conveyance vehicle 30 without having a drill bit 28 attached to the vehicle 30 (see FIGS. 1B and 1C). The logging tool 50 can emit gamma rays (or photons) into the surrounding environment and collect gamma rays that are scattered back to the tool from the surrounding environment. Improved accuracy can be achieved by forcing the tool 50 against a wall of the wellbore 12 and emitting the gamma rays directly into the formation 14 surrounding the wellbore 12 without passing through a significant amount of wellbore fluids before entering the formation 14 (or entering a mud cake, if a mud cake is present). Therefore, the logging tool 50 can include an extendable protrusion, such as an extendable arm 52 (see FIG. 2), which can be used to push against a wall of the wellbore 12, thereby pressing the tool 50 against an opposing wall of the wellbore 12. When the tool 50 is included in the BHA 26, the tool 50 may collect logging information when the drill string is rotating or stopped. It is not required that the tool be in contact with the wellbore wall to collect measurement data from the surrounding earthen formation 14. Therefore, the extendable arm 52 may not be desirable in logging while drilling operations.

Figure 1B:
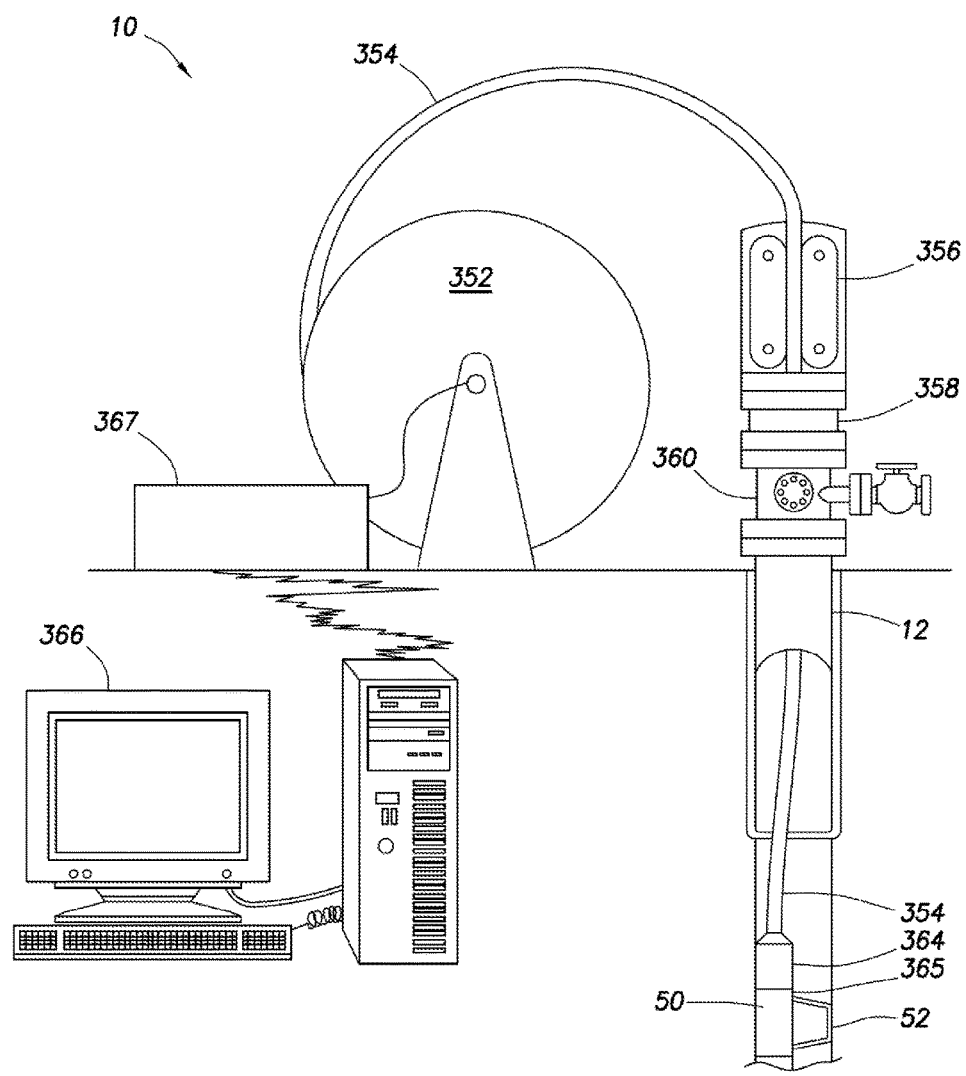
FIG. 1B is a representative partial cross-sectional view of a system for capturing subsurface measurement data in a wireline logging operation, according to one or more example embodiments.

At various times during (or after) the drilling process, the drill string 30 can be removed from the borehole 12 as shown in FIG. 1B. Once the drill string 30 has been removed, logging operations can be conducted using a wireline logging sonde 234, which can be a probe suspended by a cable 30 having conductors for conducting power to the sonde 234, and for transmitting telemetry data from the sonde 234 to the surface. The example wireline logging sonde 234 can have pads and/or centralizing springs to maintain the sonde 234 near the central axis of the borehole 12 as sonde 234 is pulled uphole. Similar to the LWD tools, the logging sonde 234 can include a variety of sensors including the logging tool 50 for measuring formation characteristics. A logging facility 244 collects measurements from the logging sonde 234, and includes processing circuitry 245 for processing and storing the measurements gathered by the logging tool 50 and possibly other logging devices in the logging sonde 234.

Figure 1C:
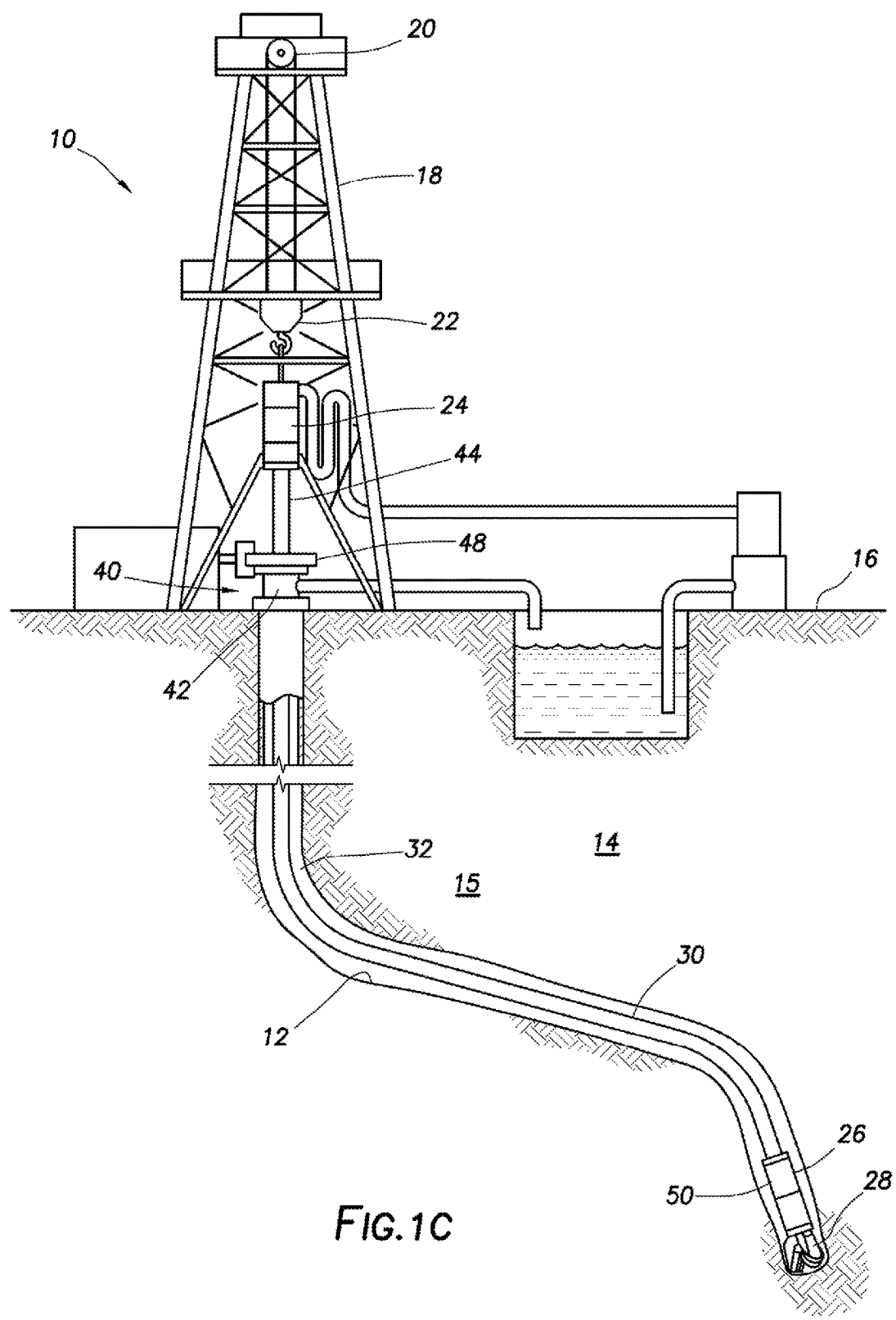
FIG. 1C is a representative partial cross-sectional view of a coiled tubing logging system for capturing subsurface measurement data, according to one or more example embodiments.

Yet a further alternative logging technique is schematically illustrated in FIG. 1C, which shows an example embodiment of a wellbore system 10 as a coiled tubing logging system. In this example system 10, coiled tubing 30 is pulled from a spool 352 by a tubing injector 356 and injected through a packer 358 and a blowout preventer 360 into the borehole 12. In the borehole 12, a supervisory sub 364, and one or more logging tools 365, including logging tool 50, are coupled to the coiled tubing 30 and configured to communicate to a surface computer system 366 via information conduits or other telemetry channels. An uphole interface 367 may be provided to exchange communications with the supervisory sub 364 and receive data to be conveyed to the surface computer system 366. Processing circuitry, in the form of the surface computer system 366, can be configured to communicate with supervisory sub 364 to set logging parameters and collect logging information from the logging tools 365. Surface computer system 366 can be configured by software to monitor and control downhole instruments 364, 365.

Figure 2:
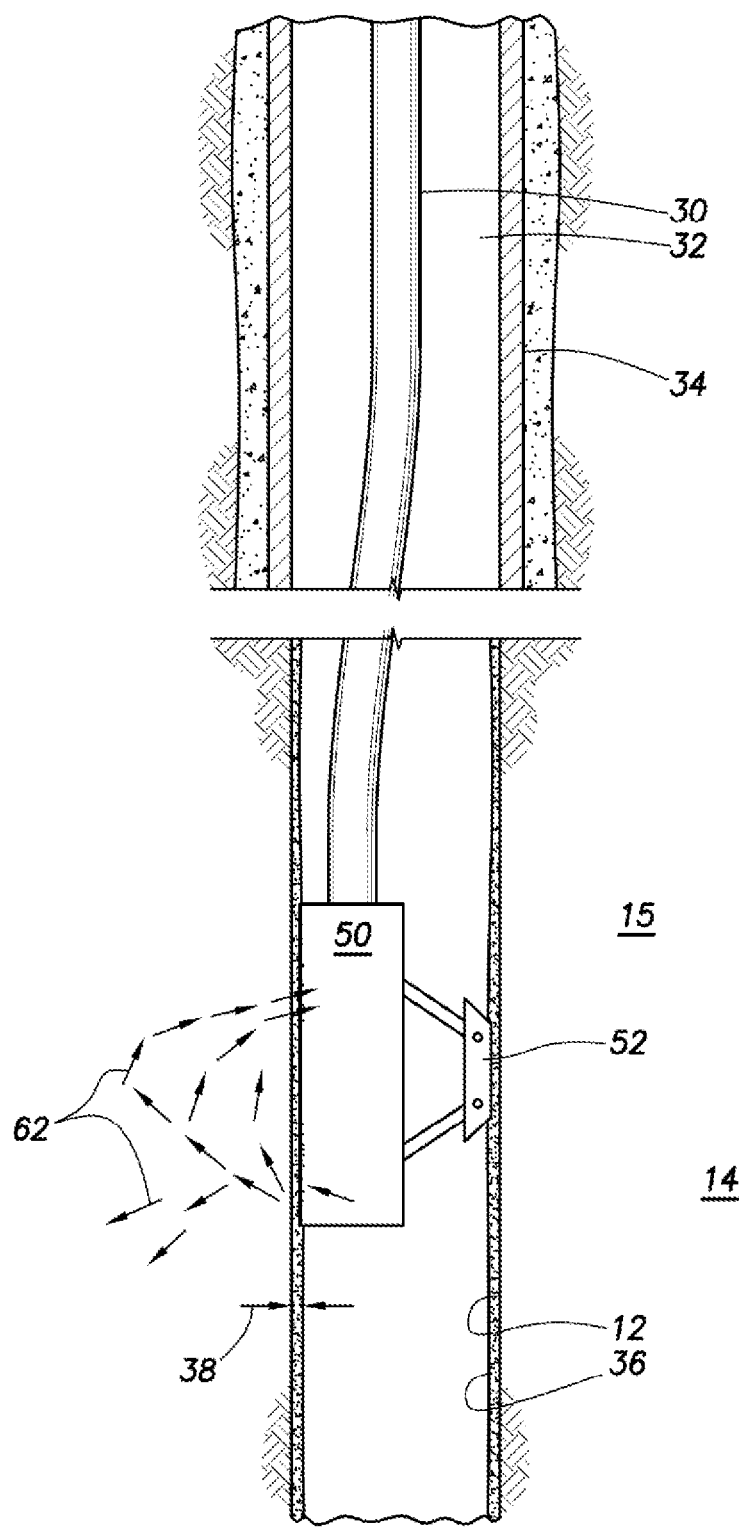
FIG. 2 is a representative partial cross-sectional view of a portion of a wellbore with a logging tool that utilizes principles of the current disclosure extended into the wellbore on a conveyance.

FIG. 2 shows an elevation view in partial cross-section of a wellbore system 10 with a wellbore 12 extending through formation 14. The logging tool 50 has been attached to an end of a conveyance vehicle 30 (such as wireline, slickline, coiled tubing string, segmented tubing string, etc.), without a BHA 26 or drill bit 28 attached. The tool 50 is shown deployed in an uncased portion of wellbore 12. It should be understood, that the tool 50 can also be positioned in cased portions of the wellbore 12 (such as with casing string 34). The tool can also be deployed in other portions (e.g. horizontal) of the wellbore 12 using known methods in the industry. Once the tool 50 has reached a desired location in the wellbore 12, an extendable arm 52 can be extended, thereby forcing the tool to press against a wall of the wellbore 12. However, as mentioned previously, it is not required that an extendable protrusion, such as the arm 52, be used at all. The tool 50 can be sufficiently close to the wall of the wellbore 12 to provide accurate measurements, which can be the case in non-vertical wellbore portions. The wellbore 12 can have a thickness 38 of a mud cake 36 lining the wellbore 12 walls, as shown in FIG. 2, or the mud cake can be absent (e.g. after the wellbore 12 has been cleaned to remove the mud cake). However, it is typical that a mud cake is present after a drilling operation.

Due to varying sensitivity of the logging tool 50, characteristics of materials 15 in the mud cake and/or the formation 14, can be determined from data collected by the logging tool 50. With the logging tool 50 in contact with the wall of the wellbore 12, then photons 60 (i.e. gamma rays) can be emitted from the tool 50 into the surrounding environment (e.g. the mud cake and formation 14) at a constant energy level. These photons 60 can be scattered by interaction with materials 15 in the surrounding environment. Some of these photons 62 can be scattered back to the wellbore 12, where the logging tool 50 can detect the returned photons 62 and count them based on their energy levels, which have changed due to the scattering. The logging tool 50 can establish count rates for various energy ranges, with photons 62 being grouped together based on their energy levels when detected by the tool 50.

FIG. 3 shows an elevation view in partial cross-section of a wellbore 12 extending through formation 14. The logging tool 50 has been extended into the wellbore 12 via conveyance vehicle 30, and deployed at that location by extending the arm 52 and forcing the tool 50 against a wall of the wellbore 12 (e.g. against a mud cake 36 or formation 14). The logging tool 50 can include a high energy photon source 54 that launches photons 60 into the surrounding environment, where some are scattered back to the tool 50 to be detected by one or more detectors 56, 58 in the tool 50. The high energy photon source 54 can be a chemical radioactive source (e.g. Caesium-137 (Cs-137) or Cobalt-60), or a photon generator (e.g. X-ray tube or gamma ray generator), or any other suitable source for emitting high energy photons 60. The detector 56, 58 can be a gamma ray detector suitable to detect scattered photons 62 (or gamma rays). The gamma ray detectors 56, 58 can be scintillator crystal coupled with a photon multiplier tube (PMT) or semiconductor detector, which measures the scattered photons 62 deposited in the detector 56, 58 and records the number of photons 62 according to their incident energy. A scintillator crystal with high light yield and high resolution at downhole temperature can be used, such as Lanthanum Bromide (LaBr3(Ce)), Cesium Iodide (CsI(Tl)), Sodium Iodide (NaI(Tl)), etc. FIG.

3 shows an example of a single detector 56 configuration. However, FIG. 4 shows a possible configuration with two detectors 56, 58 (NEAR, FAR). It should be clear that more detectors can also be used in keeping with the principles of this disclosure. In addition to the detectors 56, 58 and source 54, those of ordinary skill in the art understand that shielding material is used to block the photons 60 from traveling directly from the source 54 to the detectors 56, 58 without interacting with the surroundings. The housing of the tool 50 may be suitable for downhole environment to accommodate the temperature and pressure requirements. A collimator may also be used to enhance measurement sensitivity.

For purposes of discussion, it can be assumed that the high energy photon source 54 is a Cs-137 source that emits a high flux of photons 60 at a constant energy level of ~662 keV. However, it is not requirement that the source 54 be a Cs-137 source. The source can be any other suitable high energy photon source. It can also be assumed that interactions between the high energy photons 60 emitted from the source 54 and materials in the wellbore's surrounding environment are dominated by Compton scattering and photoelectric absorption. The photoelectric effects can result from interaction of a gamma ray with an atom in a material. In this process, the incident gamma ray disappears and transfers its energy to a bound electron of the material. The photoelectric effect is inversely proportional to the cube of energy and highly dependent on the atomic number of the material. The Compton scattering can involve interactions of individual electrons and high energy photons 60, 62. Compton scattering is a process in which only part of the photon's energy is transferred to the electron and the photon is scattered in a resulting direction with reduced energy. The Compton scattering is relatively independent of gamma ray energy and the material's atomic number. As a photon 62 travels farther into the materials 15 surrounding the wellbore 12, it will encounter more Compton scattering, and its energy will be further reduced as a result of the increased interactions. Therefore, the photons 62 collected at the detector 56, 58 that have a lower energy level have generally traveled a greater distance through the material 15 surrounding the wellbore 12 than those photons 62 collected at a higher energy level. This can indicate a different radial sensitivity to the surrounding wellbore environment, for photons 62 collected at the detectors 56, 58. This sensitivity can be applied to compute an accurate density in a wellbore 12, even if the wellbore 12 wall has a mud cake lining and/or rugose surfaces. The photoelectric effects dominate in the low energy range (e.g. less than 100 keV) while the Compton scattering dominants in the high energy range (e.g. higher than 120 keV).

Figure 5:
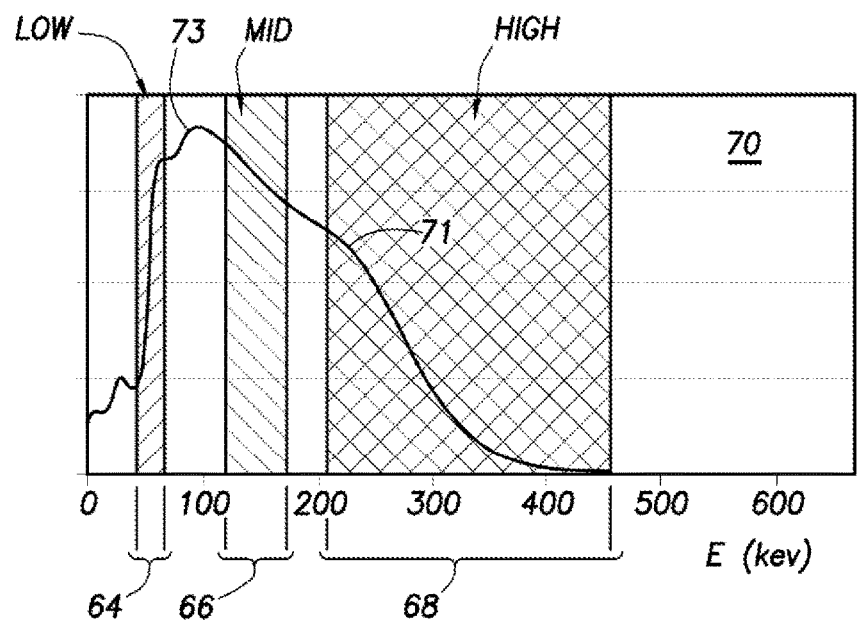
FIG. 5 is a representative plot of an energy spectrum of photons detected by the logging tool according to an embodiment.

These collected photons 62 can be grouped into various energy ranges, and count rates can be determined for each energy range. FIG. 5 shows a plot 70 the represents a distribution 71 of photons 62 counted by the detector 56 based on different energy levels. The x-axis indicates the energy level of the collected photons 62, and the y-axis represents the number of photons 62 collected at each energy level. A peak 73 of the distribution 71 is shown at an energy level of approximately 100 keV. Ranges of interest in plot 70 are illustrated by the ranges 64, 66, and 68 shown in FIG. 5. These three are given for purposes of discussion, and more or fewer ranges of interest can be identified as desired. Range 68 is identified as a HIGH range, which, in this example, represents an energy range from about 200 keV and above. Range 66 is identified as a MID range, which represents an energy range just to the right of the energy peak 73 (e.g. from about 110 keV to about 190 keV). Range 64 is identified as a LOW range, which represents an energy range just to the left of the energy peak 73 (e.g. below 100 keV).

Figure 6:
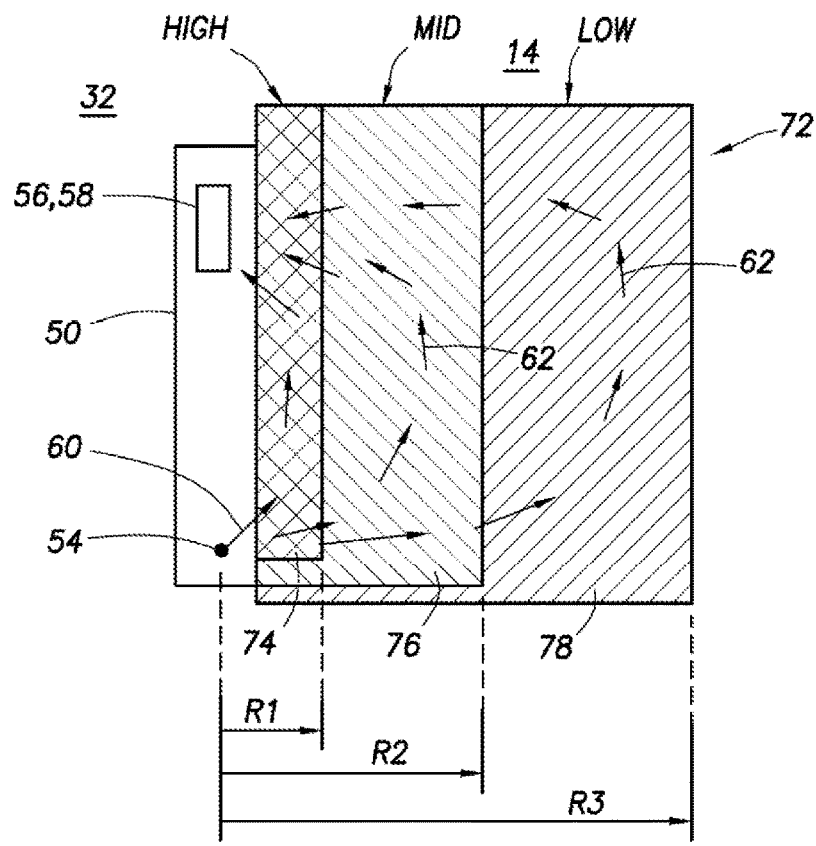
FIG. 6 is a graphical representation that indicates radial penetration from a wellbore into an earth formation of photons emitted from and detected by the logging tool.

Again, these ranges 64, 66, 68 represent the energy levels of photons 62 received by the detector 56. The photons 62 received in the LOW range 64 traveled the farthest distance through the surrounding material. The photons 62 received in the MID range 66 traveled a shorter distance through the surrounding material than those in the LOW range 64. The photons 62 received in the HIGH range 68 traveled the shortest distance through the surrounding material. This is illustrated by FIG. 6, which gives a chart 72 that shows a relative radial distance from the source 54 that the photons 62 travel. The HIGH range 68 photons may travel up to a radial distance R1 from the source 54 before being scattered back to the detector 56. The MID range 66 photons may travel up to a radial distance R2 from the source 54 before being scattered back to the detector 56. The LOW range 64 photons may travel up to a radial distance R3 from the source 54 before being scattered back to the detector 56. This varied radial intrusion into the surrounding material 15 (e.g. mud cake, formation 14, etc.) can provide for more accurate determinations of characteristics of the surrounding material 15 (e.g. density).

FIG. 7 shows plot 84 with individual linear plots 80 which indicate relative sensitivity of the three ranges 64, 66, 68 (LOW, MID, HIGH) of photon energy levels for wellbore properties. These wellbore properties can be at different locations in single and/or multiple wellbores. Each of the different locations can have different wellbore properties (e.g. formation density, mud cake density, mud cake thickness, mud density, etc.). However, as indicated by the linear plots 80 for each location, with the same wellbore conditions (mud cake density, mud cake thickness, mud density, etc.), the LOW range 64 in each plot has the highest sensitivity to the formation change at the wellbore location, the MID range 66 has less sensitivity, with the HIGH range 68 having the least sensitivity. As similarly stated previously, the deeper the photon 62 travels through the material 15 surrounding the wellbore, the more effect the material 15 will have on the energy level of the photon 62. Different material densities will affect the energy levels of the scattered photons 62 differently, as shown by plots 80.

However, the relative relationship between the ranges 64, 66, 68 remains generally the same. Therefore, count rates from the different energy ranges are a function of the characteristics of the materials 15 surrounding the wellbore (mud cake density $\rho_{mc}$ mud cake photoelectric effects $Pe_{mc}$ stand-off or mud cake thickness $t_{mc}$ formation density $\rho_f$, and formation photoelectric effects $Pe_f$), and its energy dependent depth of investigation (DOI). For a single detector configuration, equation (1) can be used to represent this relationship between count rates, and the material 15 characteristics and DOI. Determining the count rates N from a given energy range "i" and having some of the material characteristics and/or DOI known, then the unknown characteristic can be solved for by using equations provided by this disclosure. Equation (2) provides for a configuration of two or more detectors, where the count rates N for the given energy ranges "i" and "j" can be used to solve for the unknown variable (e.g. formation density, mud cake thickness, etc.).

$$\ln N_i = f(\rho_{mc}, Pe_{mc}, t_{mc}, \rho_f, Pe_f, DOI_i) \tag{1}$$

$$\ln N_{i,j} = f(\rho_{mc}, Pe_{mc}, t_{mc}, \rho_f, Pe_f, DOI_{i,j}) \tag{2}$$

The characteristics of materials 15 surrounding the wellbore can be obtained through solving the equations above using count rates from different energy ranges. Photons 62 detected at different energy ranges (e.g. ranges 64, 66, 68) have different sensitivity to the surrounding material 15 at different radial distances from the tool 50 (or wellbore). These differences can be exploited to determine the characteristics of the surrounding material 15 using a few as one detector (such as detector 56 or 58).

Figure 8A:
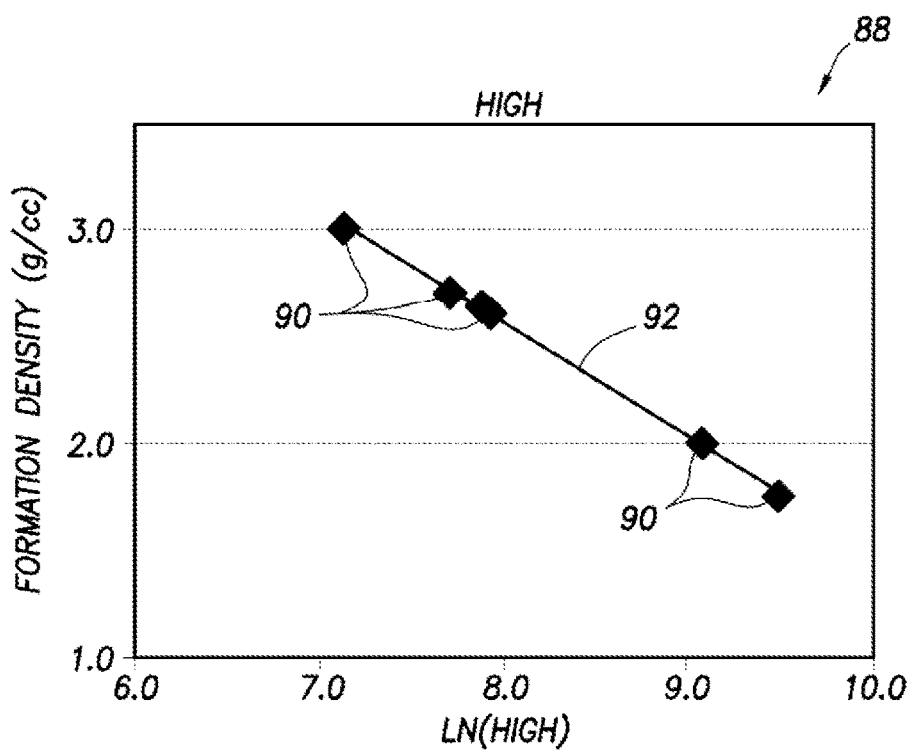
FIGS. 8A, 8B are representative plots of formation density vs. photon count rates detected by the logging tool at HIGH and MID energy ranges, respectively.
Figure 8B:
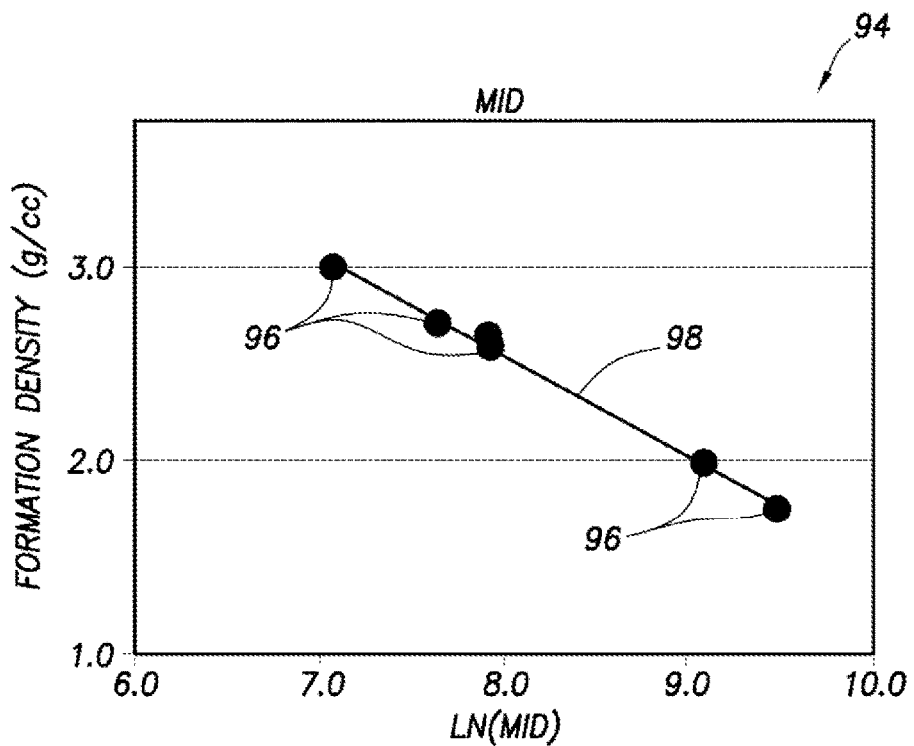

One characteristic of the surrounding material 15 that can be determined using the method and system of this disclosure is formation density $\rho_f$. When the formation density $\rho_f$ is of interest, count rates for energy ranges where the Compton scattering process is dominant (i.e. minimized photoelectric effects) can be selected. For a single detector example, ranges 66, 68 (MID, HIGH) can be selected to determine a density $\rho_f$ of the formation 14 surrounding the wellbore 12. However, other count rates can also be selected to determine the density $\rho_f$ of the formation 14 surrounding the wellbore 12. The density $\rho_f$ is linearly proportional to the natural log of a count rate for each energy range 66, 68 as given by equations (3) and (4) below:

$$\ln(HIGH) \propto \alpha_1 \rho_{HIGH} + \beta_1 \quad (3)$$

$$\ln(MID) \propto \alpha_2 \rho_{MID} + \beta_2 \quad (4)$$

Where MID and HIGH stand for the count rates in the respective energy ranges 66, 68, p is the formation density, and $\alpha_1, \alpha_2, \beta_1, \beta_2$ are fitting parameters. A dependency can be illustrated by charts 88, 94 shown in FIGS. 8A, 8B, which respectively show MID and HIGH count rates collected for known formation densities ranging from 1.7 g/cc to 3.0 g/cc. The natural log of each of the count rates MID and HIGH was determined and plotted vs. formation density on the charts 80, 82. As can be seen, the natural logs of each of the count rates have a generally linear relationship with each other as indicated by the lines 92 and 98 drawn through the know points 90, 96, respectively. Therefore, with the densities and count rates known at points 90, 96 on the lines 92, 98, the fitting parameters $\alpha_1, \alpha_2, \beta_1, \beta_2$ can be determined and then used to calculate formation densities for count rates taken at locations along the wellbore 12 with unknown densities. This calibration curve can be established through various methods, such as lab characterization on a set of formation blocks with densities covering a desired range of densities that may be encountered in field logging, as well as through computer simulations, on a selection of digital rocks, such as a Monte-Carlo N-particle Simulation.

In the presence of thick mud cake, large stand-off, and/or heavy mud, these wellbore characteristics can have a larger impact on calculations of formation densities based on count rates. However, taking advantage of the different radial sensitivities for count rates of different energy ranges, a compensation factor can be determined to minimize the effects of the wellbore characteristics on the calculation for formation densities. A compensation factor $\Delta\rho$ can be seen as a function of a formation density calculated based on at least two count rates (such as LOW-MID, LOW-HIGH, MID-HIGH, or other count rates) and mud characteristics Mud. This can be represented by equation (5):

$$\Delta\rho = f(\rho_{HIGH}, \rho_{MID}, Mud) \quad (5)$$

Thus, a compensated value for the formation density p can be given by equation (6):

$$\rho = \rho_{HIGH} + \Delta\rho \quad (6)$$

Figure 9A:
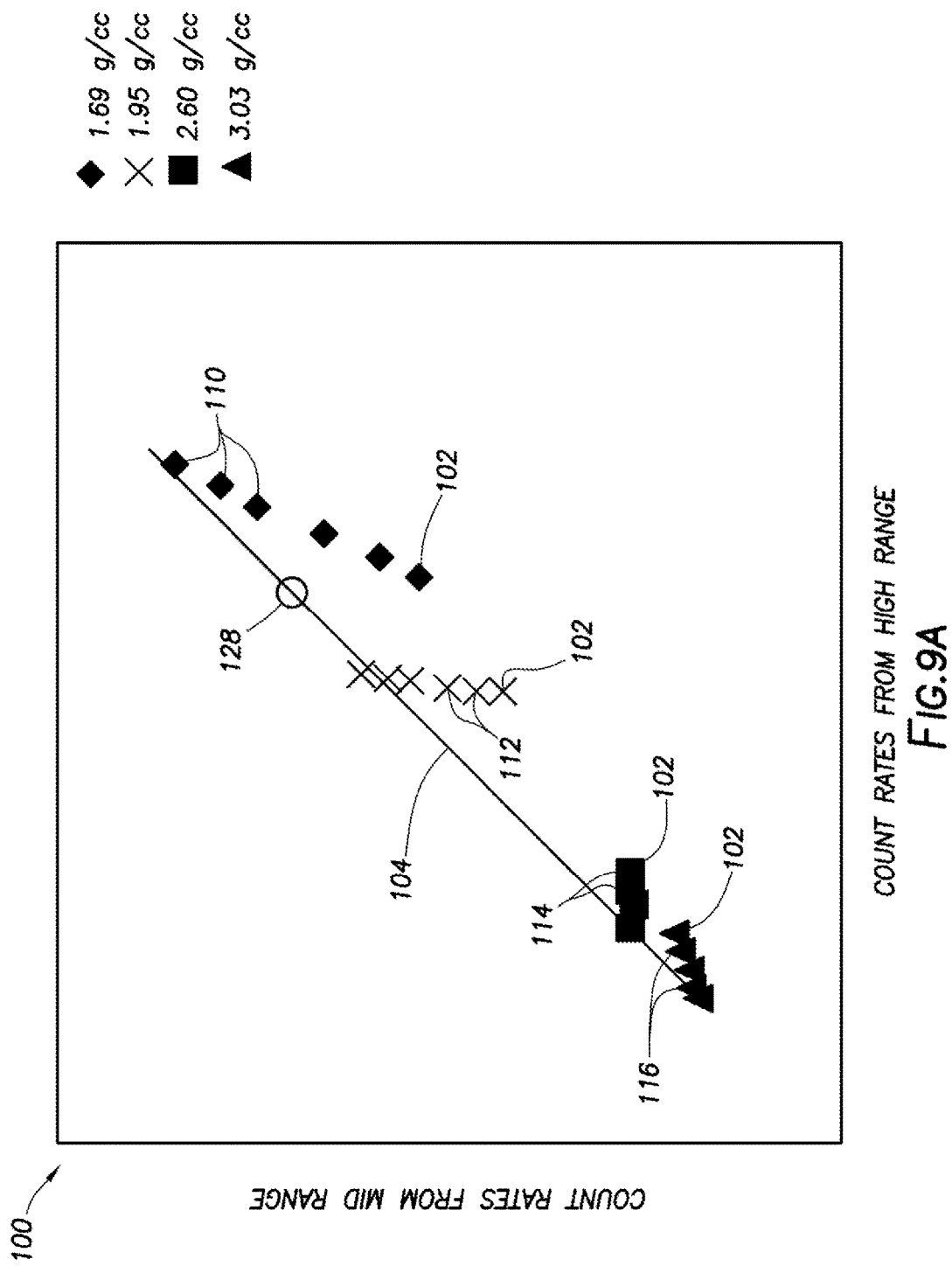
FIG. 9A is a representative plot of photon count rates for the MID energy range vs. photon count rates for the HIGH energy range.

Referring to FIG. 9A, MID, HIGH counts rates for respective energy ranges 66, 68 are collected (or simulated) for known formation densities. Chart 100 illustrates MID count rates plotted vs. HIGH count rates for various different wellbore environments (such as mud, mud cake thickness, mud cake density, etc.). Points 110, 112, 114, 116 indicate count rates MID, HIGH for formation densities of 1.69 g/cc, 1.95 g/cc, 2.60 g/cc, and 3.03 g/cc, respectively, for different wellbore environments. The variations between each of the points 110, 112, 114, 116 for the same densities can be attributed to different mud cake thicknesses, mud cake densities, irregular wellbore walls, mud characteristics, etc.

The line 104 illustrates a linear relationship between points 110, 112, 114, 116 at ideal conditions (such as no mud cake thickness, etc.). This line 104 can be one of several calibration functions which can be used to compare readings for non-ideal conditions in order to determine a compensated value for formation density which can more accurately reflect a true formation density at the location of the readings. More or fewer measurements can be taken to establish the line 104, as well as lines 108, 118, 120, and 122. There can also be more lines created than these shown if greater accuracy is desired. Once the plot 100 has been established, count rates at various other environments with unknown densities can be collected and the formation at each of these locations can be determined based on the information given by the plot 100. The difference in the High and MID sensitivity to borehole environment, characterized by different mud properties and stand-off in the calibration curves, leads to the accurate estimate of formation characteristics by applying the necessary correction to the estimated value solely based on the count rates from one energy window.

Figure 9B:
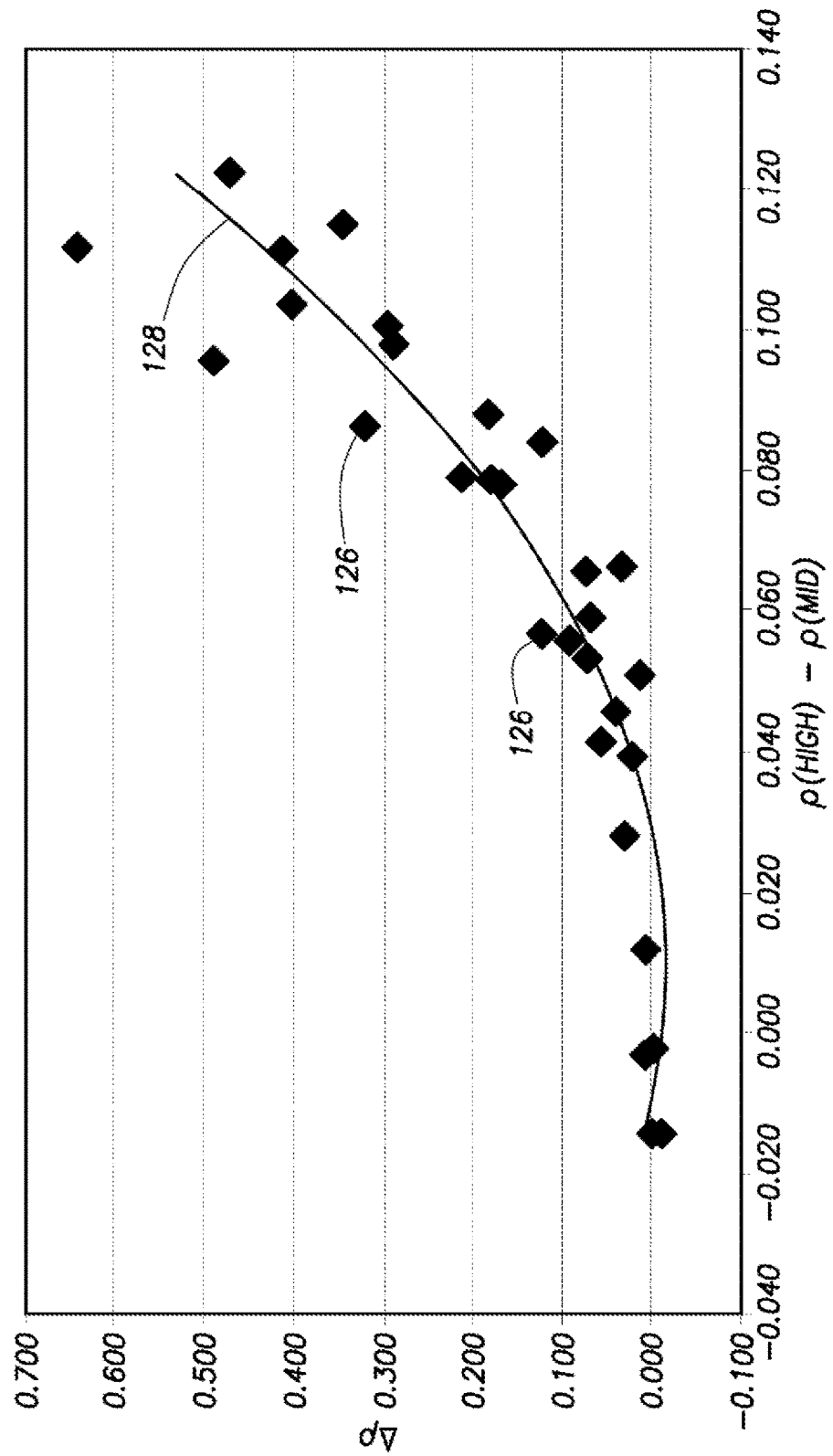
FIG. 9B is a representative plot of density correction values vs. a difference between the respective calculated densities for photon count rates for the MID and HIGH energy ranges.

FIG. 9B gives an approximation for a formation density correction value $\Delta\rho$ to a computed density (e.g. $\rho(HIGH)$) in irregular wellbore conditions, where the density correction is dependent upon a computed density in two or more energy ranges (e.g. ranges 64, 66, 68) based on respective count rates for the energy ranges. For example, by computing a respective density for each of the energy ranges 66, 68 (i.e. MID and HIGH) through the calibration functions 92, 98 in FIGS. 8A and 8B, two densities can be computed for each characterization data point. The formation density correction value $\Delta\rho$ that more closely approximates a true formation density is defined as $\Delta\rho = \rho - \rho(HIGH)$. Therefore, the correction value can be applied to the HIGH window density to obtain the true formation density, as given here: $\rho = \rho(HIGH) + \Delta\rho$. Alternatively, and/or in addition to, the formation density correction value $\Delta\rho$ can be calculated through fitting the line 104 in FIG. 9A. Other mathematical methods can also be adopted as long as they establish a relationship between a true formation density and the density obtained with one energy range 64, 66, 68, thereby providing correction to compensate for the computed density from the energy range 64, 66, 68 in irregular wellbore conditions. Although the example to compute density above is demonstrated through two energy ranges 66, 68 (MID, HIGH), it can also be applied to three energy ranges 64, 66, 68 (LOW, MID, HIGH), for example, where the density from one energy range can be corrected by using the density results from a set of two energy ranges and then the final density output can be corrected from the third density and the newly corrected density.

Yet another characteristic of the formation can be determined based on photon counts at various energy ranges, such as ranges 64, 66, 68. This formation characteristic is an atomic composition of the formation, which can be referred to as a photoelectric factor (Pe). The Pe is dominant when the energy of the photons 62 is reduced to a level below 100 keV and/or when the photons 62 encounter material of heavy elements. With one detector, the count rates for the LOW energy range 64 can be affected by 1) a Pe value of a shallow layer (such as mud cake) and 2) the density of the formation 14. This relationship can be illustrated by equation (7):

$$\ln(\text{LOW}) \propto \rho(\gamma + \lambda Pe) \qquad (7)$$

The MID and HIGH energy ranges 66, 68, as stated previously, are largely only affected by the density of materials in the environment surrounding the wellbore 12 and are not generally affected by the photoelectric factor (Pe). Therefore, this relationship with the HIGH energy range can be illustrated by equation (8):

$$\ln(\text{HIGH}) \propto \rho \qquad (8)$$

Taking a ratio of ln(LOW) and ln(HIGH) yields:

$$\frac{\ln(\text{LOW})}{\ln(\text{HIGH})} \propto Pe \qquad (9)$$

Figure 10:
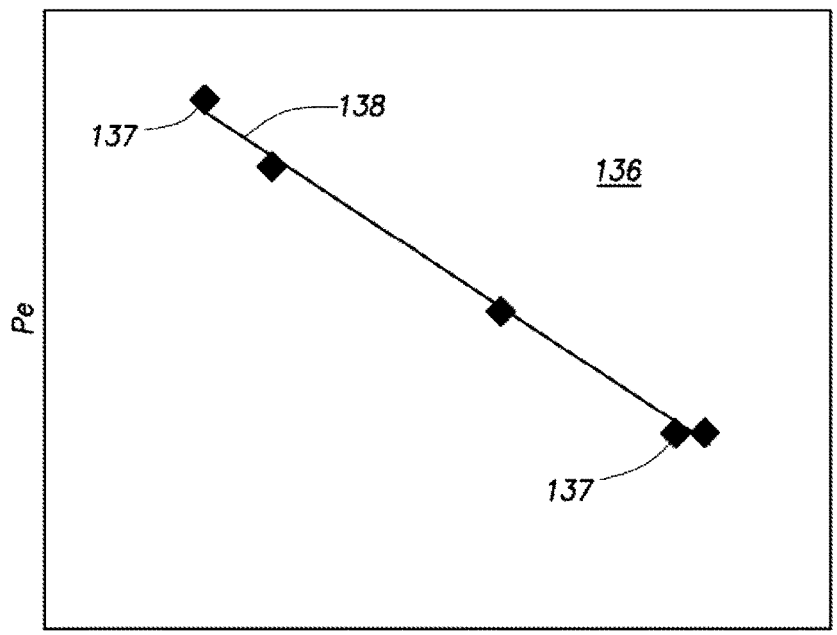
FIG. 10 is a representative plot of photoelectric factor (Pe) vs. a ratio of count rates for LOW and HIGH energy ranges.

FIG. 10 shows a plot 136 of equation (9) and illustrates the Pe dependence of the ratio of the logarithmic LOW and HIGH count rates for energy ranges 64, 68. Line 138 illustrates the linear relationship between the ratio of the logarithmic LOW and HIGH count rates which can be established between two or more points 137 for LOW and HIGH count rates taken at known Pe values. Similar calculations can be performed using LOW and MID count rates, as well as other count rates.

Similar calculations to the ones given above can be performed using count rates from two or more photon detectors (such as 56, 58). As seen in FIG. 4, there can be two or more detectors used to collect and count photons 62 scattered back to the wellbore 12. In this example, two detectors 56, 58 are spaced at a certain distance away from the photon source 54, with a NEAR detector 56 close to the source and a FAR detector 58 further away from the source 54. A combination of photon count rates for various energy ranges (such as ranges 64, 66, 68) from both detectors can improve measurement sensitivity to formation density.

Figure 11:
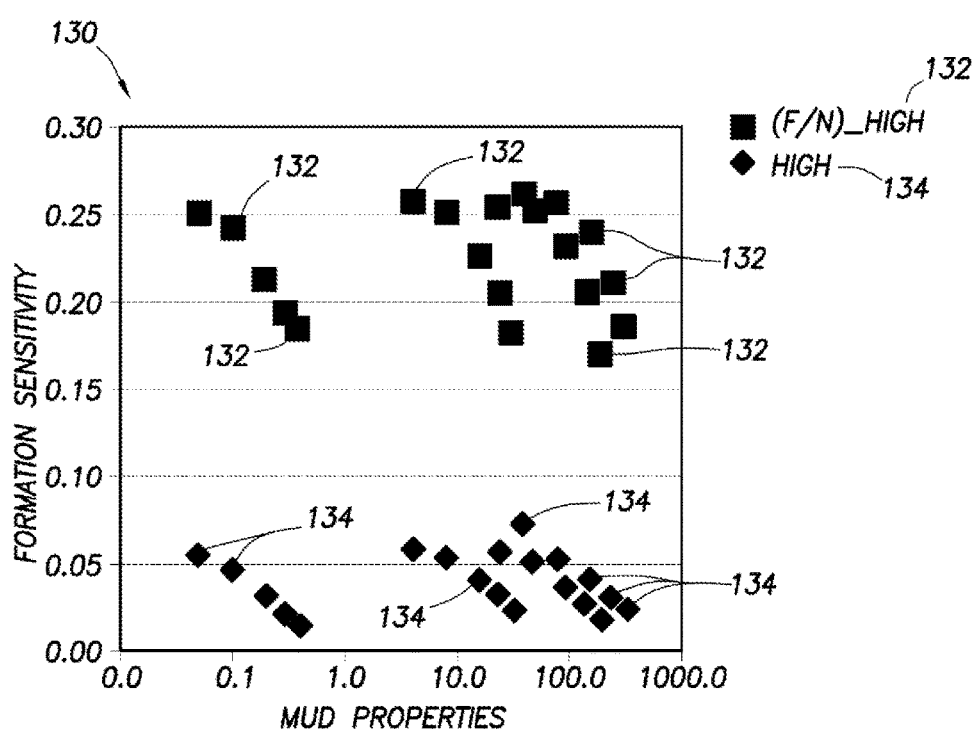
FIG. 11 is a representative plot comparing a formation sensitivity of photons detected by a single detector logging tool to a formation sensitivity of photons detected by a two detector logging tool.

As seen in FIG. 11, a mathematical combination of HIGH count rates 132, (F/N) HIGH, for energy range 68 from both detectors (NEAR 56 and FAR 58) can yield a greater sensitivity to the surrounding environment than a single HIGH count rate 134 from a single detector 56. Measurements were taken (or simulated) for several different wellbore environments and the count rates for the same energy range 68 for both detectors 56, 58 was combined. In each case, the combination of count rates exceeded the sensitivity of a single count rate. For a given energy range in the NEAR 56 and FAR 58 detectors, the count rates measured can be approximated as given in equations (10) and (11):

$$\text{FAR} \propto Ne^{-(\rho_F x_F + 2\rho_{mc} t_{mc} + f(Pe))} \qquad (10)$$

$$\text{NEAR} \propto Ne^{-(\rho_N x_N + 2\rho_{mc} t_{mc} + f(Pe))} \qquad (11)$$

where ρ(F,N) represents the density in the formation, $\rho_m$, is the density of mud cake (or mud), $t_{mc}$ is the thickness of mud cake (or wellbore stand-off), $x_F$ is the effective distance between the photon source 54 and the FAR detector 58, $x_N$ is the effective distance between the gamma ray source and the NEAR detector 56. Taking the logarithmic count rates for each detector and finding their difference can yield an approximation of density multiplied by the distance between the NEAR and FAR detectors 56, 58 as seen in equation (12) below:

$$\ln(\text{NEAR}) - \ln(\text{FAR}) = \ln\frac{\text{NEAR}}{\text{FAR}} \propto \rho \Delta x \qquad (12)$$

where Δx is the spacing between the NEAR and FAR detectors 56, 58. Therefore the ratio of NEAR to FAR detector count rates for the same energy range (e.g. range 64, 66, 68) can be used to estimate the formation density with little to no Pe effect.

Figure 12:
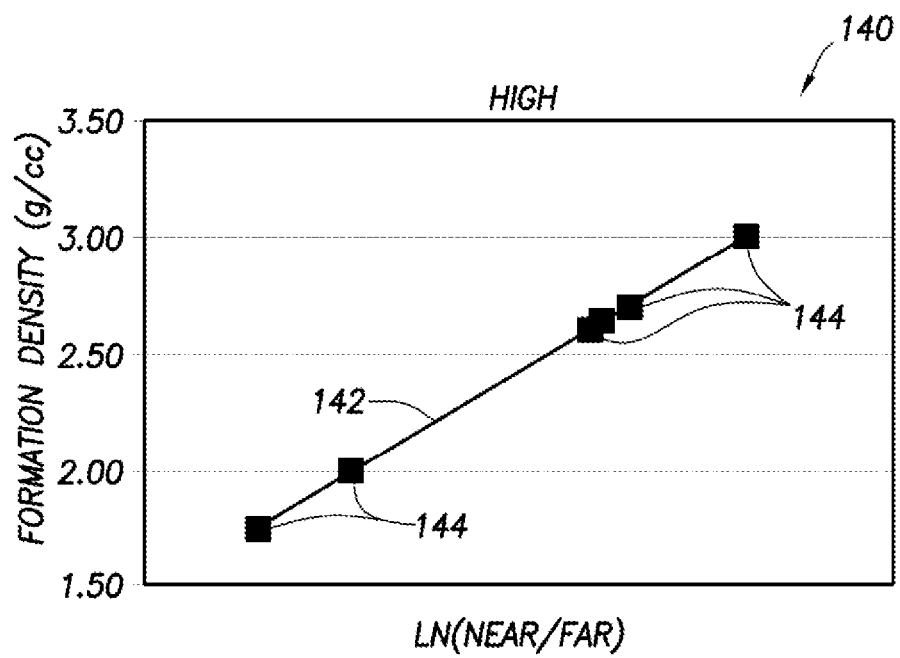
FIGS. 12, 13 are representative plots of formation density vs. a logarithmic ratio of photon count rates detected at near and far detectors of the logging tool at HIGH and LOW energy ranges, respectively.
Figure 13:
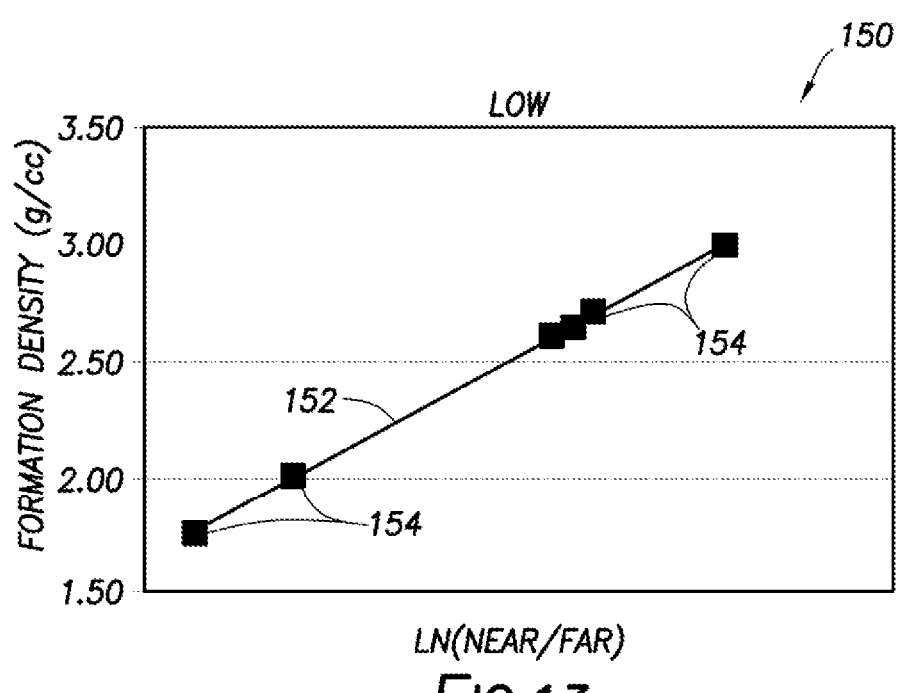

Similar to the one detector configuration, calibration curves for the formation density can be determined for each ratio of count rates for different energy ranges, as shown in FIGS. 12, 13. With two detectors 56, 58, the formation density can be determined based on the photon count rates (e.g. LOW, MID, HIGH count rates for energy ranges 64, 66, 68) for the NEAR and FAR detectors 56, 58. The respective formation densities can be determined by equations (13), (14), and (15) below:

$$\rho_{LOW} = \lambda_1 \ln\left(\frac{\text{NEAR}}{\text{FAR}}\right)_{LOW} + \gamma_1 \qquad (13)$$

$$\rho_{MID} = \lambda_2 \ln\left(\frac{\text{NEAR}}{\text{FAR}}\right)_{MID} + \gamma_2 \qquad (14)$$

$$\rho_{HIGH} = \lambda_3 \ln\left(\frac{\text{NEAR}}{\text{FAR}}\right)_{HIGH} + \gamma_3 \qquad (15)$$

Where ρ is the respective calculated formation densities, NEAR and FAR are the photon count rates at a particular energy range, and λ and γ are filler parameters.

FIGS. 12 and 13 illustrate the logarithmic ratio of NEAR and FAR detector count rates vs. formation density. Line 142 represents a plot of the equation (13), while line 152 represents a plot of the equation (15). Points 144, 154 indicate NEAR and FAR detector count rates collected for HIGH and LOW energy ranges, respectively, at various known formation densities. As before, the filler parameters can be determined by collecting the NEAR and FAR detector count rates for an energy range 64, 66, 68 at known densities, then using these parameters to solve for unknown formation densities. FIGS. 12 and 13 illustrate only two possible examples of the count rates that can be used to determine formation density for materials 15 in the surrounding environment of the wellbore 12.

Figure 14:
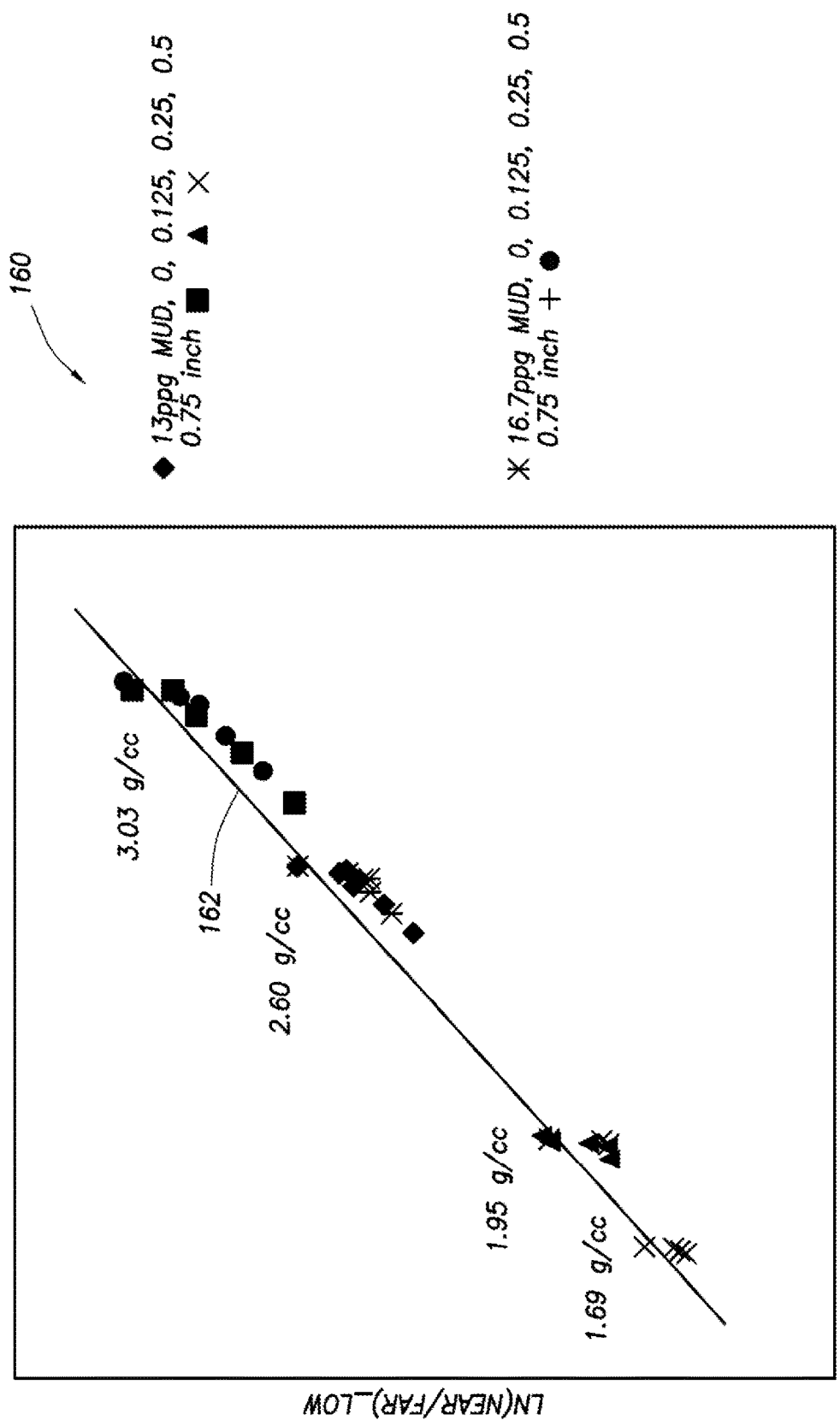
FIG. 14 is a representative plot of a logarithmic ratio of near and far photon count rates for the LOW energy range vs. a logarithmic ratio of near and far photon count rates for the HIGH energy range.

Referring to FIG. 14, plot 160 illustrates that a very similar process to the one related to FIG. 9 can be performed to determine a compensation value Δρ for adjusting formation density calculations, thereby reducing effects of mud cake, mud densities, etc. on the formation density calculations. Line 162 represents the formation density line with ideal wellbore conditions (such as no mud cake thickness, etc.). The plot 160 plots the logarithmic ratio of NEAR and FAR count rates for a HIGH energy range 68 vs. the logarithmic ratio of NEAR and FAR count rates for a LOW energy range 64. The rest of the process is much the same as given for FIG. 9. Please note that the points in the plot 160 relate to measurements taken at the 5 different mud cake thicknesses of 0, 0.125, 0.25, 0.5, and 0.75, with 13 ppg mud and 16.7 ppg mud.

In all embodiments, when the characteristic of the material 15 is calculated or determined, it can be stored in a downhole media and/or transferred to surface and displayed to an operator, where an operator action can be performed in response to the displayed value. These operator actions can include, but are not limited to, logging value for future use, adjusting the RPM of the drill bit 28, adjusting mud properties, adjusting rate of penetration of the drill string into the formation 14, adjusting mud flow, etc. These actions can be taken at any time after the value has been displayed.

Thus, a method for determining at least one characteristic of a material 15 surrounding a wellbore 12 has been described. Embodiments of the method may generally include positioning a logging tool 50 at a location in the wellbore 12 (where the tool 50 can include a photon source 54, and one or more detectors 56, 58), emitting photons 60 from the photon source 54, detecting photons 62 scattered by the material 15, counting the detected photons 62 based on an energy level of the detected photons 62, grouping the detected photons 62 in at least first and second energy ranges, with a first count rate representing a number of photons 62 detected in the first energy range 64, 66, 68, and a second count rate representing a number of photons 62 detected in the second energy range 64, 66, 68, and calculating a value of the characteristic of the material 15 based on at least one of the first and second count rates. Then, possibly displaying the calculated value to an operator, where an operator action can be initiated in response to the displayed value, such as changing a drilling parameter, changing a mud characteristic, changing direction of drilling, etc. The tool 50 can be repositioned along the wellbore to obtain the formation characteristics over an extended distance.

Other embodiments of the method may generally include positioning a logging tool 50 at a location in the wellbore 12 (where the tool 50 can include a photon source 54, and one or more detectors 56, 58), emitting photons 60 from the photon source 54, detecting photons 62 scattered by the material 15, counting the detected photons 62 based on an energy level of the detected photons 62, grouping the detected photons 62 in at least first and second energy ranges 64, 66, 68, with a first count rate representing a number of photons 62 detected by the near detector 56 in the first energy range 64, 66, 68, a second count rate representing a number of photons 62 detected by the far detector 58 in the first energy range 64, 66, 68, a third count rate representing a number of photons 62 detected by the near detector 56 in the second energy range 64, 66, 68, a fourth count rate representing a number of photons 62 detected by the far detector 58 in the second energy range 64, 66, 68, and calculating a value of the characteristic based on either one or both of first and second ratios, where the first ratio is a ratio of the first and second count rates and the second ratio is a ratio of the third and fourth count rates. Then possibly displaying the calculated value to an operator, where an operator action is initiated in response to the displayed value, such as changing a drilling parameter, changing a mud characteristic, changing direction of drilling, etc. The tool 50 can be repositioned along the wellbore to obtain the formation characteristics over an extended distance. The method can also be used in post-processing after the logging operation has been accomplished.

For any of the foregoing embodiments, the method may include any one of the following elements, alone or in combination with each other:

The first count rate can be proportional to a characteristic of a portion of the material 15 within a first radial distance R3, R2 from the wellbore 12, wherein the second count rate can be proportional to the characteristic of a portion of the material 15 within a second radial distance R2, R1 from the wellbore 12, and with the first radial distance R3, R2 being greater than the second radial distance R2, R1. The material 15 can include at least one selected from the group consisting of mud, mud cake 36, and earth formation 14.

The method can also include detecting count rates of scattered photons 62 for the first energy range 64, 66, 68 based on first and second known values of the material 15 characteristic, and determining a first calibrated function based on the first energy range 64, 66, 68 count rates that are based on the first and second known values, and determining the calculated value of the characteristic based on the calibrated function 92, 98 and the first count rate. Then displaying the calculated value to an operator, where an operator action is initiated in response to the displayed value.

The method can also include determining a sufficient number of count rates of scattered photons 62 for the particular energy ranges (such as ranges 64, 66, 68) based on known values of the material 15 characteristic to determine a calibrated function (such as lines 92, 98, 104, 138). These calibrated functions can then be used to calculate the characteristic value by comparing the count rates to the calibrated functions and calculating the characteristic value based on the calibrated functions (e.g. lines 92, 98, 104, 138). The calibrating count rates can be determined by positioning the photon source 54 at a first location and detecting scattered photons 62 for the first and second energy ranges 64, 66, 68, positioning the photon source 54 at a second location and detecting scattered photons 62 for the first and second energy ranges 64, 66, 68, with known values associated with each location, where the first and second locations can be locations in the wellbore 12, in a different wellbore, or in the wellbore 12 and in a different wellbore. A plurality of calibrating count rates can be determined through actual and/or simulated measurements. These actual measurements can be taken with multiple formation blocks in a very controlled environment in a lab and/or a controlled environment in a wellbore 12.

The material 15 characteristic can be at least one of a formation density, a formation photoelectric factor, a mud density, a mud photoelectric factor, and a mud cake thickness. The first energy range 64 can be less than 100 keV and the second energy range 66, 68 can be greater than or equal to 100 keV. Alternatively, the first energy range 66 can be between 100 keV and 200 keV, with the second energy range 68 being greater than or equal to 200 keV. Other ranges of photon energy values can be given for the energy ranges 64, 66, 68.

The method can also include detecting, via the near detector and the far detector, count rates of scattered photons 62 for the first energy range 64, 66, 68 based on at least first and second known values of the material 15 characteristic, plotting the at least first and second known values vs. the respective logarithmic ratios of the near and far count rates for the at least first and second known values, and determining a first calibrated function based on a linear relationship between the plotted logarithmic ratios, and determining the calculated value of the characteristic based on the first calibrated function and the first logarithmic ratio. Calculating a first value of the characteristic based on the first logarithmic ratio, calculating a second value of the characteristic based on the second logarithmic ratio, and determining a correction value by calculating a difference between the first and second calculated characteristic values, and adjusting one of the first and second calculated characteristic values by the correction value to determine a true value of the material 15 characteristic at the location in the wellbore 12.

A system for determining at least one characteristic of a material surrounding a wellbore, can include a photon source positioned at a location in the wellbore, at least one detector positioned in the wellbore, and processing circuitry that can perform operations that can include: emitting photons from the photon source, detecting, via the detector, photons scattered by the material and counting the detected photons based on an energy level of the detected photons, grouping the detected photons in at least first and second energy ranges, with a first count rate representing a number of photons detected in the first energy range, and a second count rate representing a number of photons detected in the second energy range, and calculating a value of the characteristic based on at least one of the first and second count rates. The first count rate can be proportional to a characteristic of the material within a first radial distance from the wellbore, and the second count rate can be proportional to a characteristic of the material within a second radial distance from the wellbore, where the first radial distance can be greater than the second radial distance. The operations can also include detecting count rates of scattered photons for the first energy range based on first and second known values of the material characteristic, and determining a first calibrated function based on the first energy range count rates that are based on the first and second known values. The operations can also include determining the calculated value of the characteristic based on the first calibrated function and the first count rate, detecting count rates of scattered photons for the second energy range based on the first and second known values, and determining a second calibrated function based on the second energy range count rates that are based on the first and second known values.

The operations can also include determining a first calculated value of the characteristic based on the first calibrated function and the first count rate, determining a second calculated value of the characteristic based on the second calibrated function and the second count rate, determining a correction value by calculating a difference between the first and second calculated values, and adjusting one of the first and second calculated values by the correction value to determine a true value of the characteristic of the material at the location in the wellbore.

The operations can also include determining the count rates for the first and second energy ranges for the first known value by positioning the photon source at a first location, and determining the count rates for the first and second energy ranges for the second known value by positioning the photon source at a second location. Alternatively, or in addition to, the count rates for the first and second energy ranges at the first and second known values can be determined by simulation.

The first energy range can be less than 100 keV and the second energy range can be greater than or equal to 100 keV. The operations can also include calculating a result of a calibrated function based on a first ratio of a logarithm of the first count rate and a logarithm of the second count rate, thereby determining the characteristic of the material at the location, determining the calibrated function by detecting multiple count rates at the first and second energy ranges for at least first and second known values of the material characteristic, and plotting the at least first and second known values vs. multiple ratios of a logarithm of the first energy range count rates and a logarithm of the respective second energy range count rates, where the material characteristic can be a photoelectric factor of the material surrounding the wellbore, and the material surrounding the wellbore can be at least one of a group consisting of an earth formation, a mud cake, and a mud.

Alternatively, the first energy range can be from 110 keV to 190 keV and the second energy range can be greater than or equal to 200 keV. The operations can also include detecting count rates of scattered photons for the first and second energy ranges based on a first known value of the material characteristic, detecting count rates of scattered photons for the first and second energy ranges based on a second known value of the material characteristic, and determining a calibrated function based on a plot of the count rates for the first energy range vs. the count rates for the second energy range.

Furthermore, the illustrative methods described herein may be implemented by a system comprising processing circuitry that can include a non-transitory computer readable medium comprising instructions which, when executed by at least one processor of the processing circuitry, causes the processor to perform any of the methods described herein.

Moreover, those ordinarily skilled in the art will appreciate that embodiments of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. Embodiments of the disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system. Subject to network reliability, at least a portion of the techniques described herein for determining the characteristic of the material surrounding the wellbore may be performed in real-time to update production, enhance oil recovery ("EOR") operations, adjusting the RPM of the drill bit 28, adjusting mud properties, adjusting rate of penetration of the drill string into the formation 14, and/or other operations.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

The invention claimed is:

1. A method of determining at least one characteristic of a material surrounding a wellbore, the method comprising:
   positioning a photon source at a location in the wellbore;
   positioning at least one detector in the wellbore;
   emitting photons from the photon source;
   detecting, via the detector, photons scattered by the material;
   the detector counting the detected photons based on an energy level of the detected photons;
   grouping the detected photons in at least first and second energy ranges, with a first count rate representing a number of photons detected in the first energy range, and a second count rate representing a number of photons detected in the second energy range;

calculating a result of a calibrated function based on a first ratio of a logarithm of the first count rate and a logarithm of the second count rate, thereby determining the characteristic of the material at the location; and calculating a value of the characteristic based on at least one of the first and second count rates.

2. The method of claim 1, wherein the first count rate is proportional to a characteristic of the material within a first radial distance from the wellbore, wherein the second count rate is proportional to a characteristic of the material within a second radial distance from the wellbore, and wherein the first radial distance is greater than the second radial distance, wherein the material comprises at least one selected from the group consisting of mud, mud cake, and earth formation.

3. The method of claim 1, further comprising detecting count rates of scattered photons for the first energy range based on first and second known values of the material characteristic, and determining a first calibrated function based on the first energy range count rates that are based on the first and second known values.

4. The method of claim 3, further comprising determining the calculated value of the characteristic based on the first calibrated function and the first count rate.

5. The method of claim 3, further comprising detecting count rates of scattered photons for the second energy range based on the first and second known values, and determining a second calibrated function based on the second energy range count rates that are based on the first and second known values.

6. The method of claim 5, further comprising determining a first calculated value of the characteristic based on the first calibrated function and the first count rate, and determining a second calculated value of the characteristic based on the second calibrated function and the second count rate; and determining a correction value by calculating a difference between the first and second calculated values, and adjusting one of the first and second calculated values by the correction value to determine a true value of the characteristic of the material at the location in the wellbore.

7. The method of claim 5, wherein the count rates for the first and second energy ranges for the first known value are determined by positioning the photon source at a first location, and wherein the count rates for the first and second energy ranges for the second known value are determined by positioning the photon source at a second location.

8. The method of claim 1, wherein the material characteristic is selected from a group consisting of a formation density, a formation photoelectric factor, a mud density, a mud photoelectric factor, and a mud cake thickness.

9. The method of claim 1, wherein the first energy range is less than 100 keV and the second energy range is greater than or equal to 100 keV.

10. The method of claim 1, wherein the calibrated function is determined by detecting multiple count rates at the first and second energy ranges for at least first and second known values of the material characteristic, and plotting the at least first and second known values vs. multiple ratios of a logarithm of the first energy range count rates and a logarithm of the respective second energy range count rates, wherein the material characteristic is a photoelectric factor of the material surrounding the wellbore, and wherein the material surrounding the wellbore is at least one of a group consisting of an earth formation, a mud cake, and a mud.

11. The method of claim 1, wherein the first energy range is from 110 keV to 190 keV and the second energy range is greater than or equal to 200 keV, and wherein the method further comprises detecting count rates of scattered photons for the first and second energy ranges based on a first known value of the material characteristic, and detecting count rates of scattered photons for the first and second energy ranges based on a second known value of the material characteristic.

12. A method of determining at least one characteristic of a material surrounding a wellbore, the method comprising:

positioning a photon source at a location in the wellbore;

positioning at least a near detector and a far detector in the wellbore;

emitting photons from the photon source;

detecting, via the near and far detectors, photons scattered by the material;

the near and far detectors counting the detected photons based on an energy level of the detected photons;

grouping the detected photons in at least first and second energy ranges, with a first count rate representing a number of photons detected by the near detector in the first energy range, a second count rate representing a number of photons detected by the far detector in the first energy range, a third count rate representing a number of photons detected by the near detector in the second energy range, a fourth count rate representing a number of photons detected by the far detector in the second energy range;

calculating a first value of the characteristic based on at least one of a first logarithmic ratio of the first and second count rates and a second logarithmic ratio of the third and fourth count rates; and calculating a result of a calibrated function based on a first ratio of a logarithm of the first and second count rate and a logarithm of the third and fourth count rate, thereby determining the characteristic of the material at the location.

13. The method of claim 12, further comprising:

detecting, via the near detector and the far detector, count rates of scattered photons for the first energy range based on at least first and second known values of the material characteristic;

plotting the at least first and second known values vs. the respective logarithmic ratios of the near and far count rates for the at least first and second known values; and determining the calculated first value of the characteristic based on the first calibrated function and the first logarithmic ratio.

14. The method of claim 12, further comprising calculating the first value of the characteristic based on the first logarithmic ratio;

calculating a second value of the characteristic based on the second logarithmic ratio; and determining a correction value by calculating a difference between the first and second calculated characteristic values, and adjusting one of the first and second calculated characteristic values by the correction value to determine a true value of the characteristic at the location in the wellbore.

15. A system for determining at least one characteristic of a material surrounding a wellbore, the system comprising:

a photon source positioned at a location in the wellbore;

at least one detector positioned in the wellbore; and processing circuitry that performs operations comprising:

emitting photons from the photon source;

detecting, via the detector, photons scattered by the material;

the detector counting the detected photons based on an energy level of the detected photons;

grouping the detected photons in at least first and second energy ranges, with a first count rate representing a number of photons detected in the first energy range, and a second count rate representing a number of photons detected in the second energy range;

calculating a result of a first calibrated function based on a first ratio of a logarithm of the first count rate and a logarithm of the second count rate, thereby determining the characteristic of the material at the location; and calculating a value of the characteristic based on at least one of the first and second count rates.

16. The system of claim 15, wherein the operations further comprise detecting count rates of scattered photons for the first energy range based on first and second known values of the material characteristic.

17. The system of claim 16, wherein the operations further comprise determining the calculated value of the characteristic based on the first calibrated function and the first count rate.

18. The system of claim 16, wherein the operations further comprise detecting count rates of scattered photons for the second energy range based on the first and second known values, determining a second calibrated function based on the second energy range count rates that are based on the first and second known values, determining a first calculated value of the characteristic based on the first calibrated function and the first count rate, determining a second calculated value of the characteristic based on the second calibrated function and the second count rate, determining a correction value by calculating a difference between the first and second calculated values, and adjusting one of the first and second calculated values by the correction value to determine a true value of the characteristic of the material at the location in the wellbore.

19. The system of claim 15, wherein the first energy range is less than 100 keV and the second energy range is greater than or equal to 100 keV, wherein the operations further comprise determining the characteristic of the material at the location, determining the calibrated function by detecting multiple count rates at the first and second energy ranges for at least first and second known values of the material characteristic, and plotting the at least first and second known values vs. multiple ratios of a logarithm of the first energy range count rates and a logarithm of the respective second energy range count rates, wherein the material characteristic is a photoelectric factor of the material surrounding the wellbore, and wherein the material surrounding the wellbore is at least one of a group consisting of an earth formation, a mud cake, and a mud.

* * * * *